(12) United States Patent
Kim

(10) Patent No.: US 8,240,747 B2
(45) Date of Patent: Aug. 14, 2012

(54) MOUNTING STRUCTURE OF FRONT BODY FRAME IN VEHICLE

(75) Inventor: Yong Kew Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 80 days.

(21) Appl. No.: 12/862,508

(22) Filed: Aug. 24, 2010

(65) Prior Publication Data

US 2011/0115257 A1    May 19, 2011

(30) Foreign Application Priority Data

Nov. 19, 2009    (KR) .................. 10-2009-0111768

(51) Int. Cl.
*B62D 25/08*    (2006.01)
(52) U.S. Cl. ............... 296/192; 296/193.09; 296/203.02
(58) Field of Classification Search ............ 296/30, 296/187.12, 192, 193.09, 198, 203.01, 203.02; *B62D 25/08*
See application file for complete search history.

(56) References Cited

U.S. PATENT DOCUMENTS

| 4,955,663 | A * | 9/1990 | Imura ............... 296/203.02 |
| 2005/0067858 | A1 * | 3/2005 | Suh et al. ............. 296/192 |

FOREIGN PATENT DOCUMENTS

| JP | 2-303976 A | | 12/1990 |
| JP | 2001-80544 A | | 3/2001 |
| JP | 2003182633 A | * | 7/2003 |
| JP | 2007-118636 A | | 5/2007 |
| JP | 2008-260331 A | | 10/2008 |
| KR | 10-0535004 B1 | | 12/2005 |
| KR | 10-2008-0054905 A | | 6/2008 |

* cited by examiner

*Primary Examiner* — Dennis Pedder
*Assistant Examiner* — Jason S Daniels
(74) *Attorney, Agent, or Firm* — Morgan, Lewis & Bockius LLP

(57) ABSTRACT

A mounting structure of a front body frame in a vehicle may include: a pair of support members whose lower part is equipped to be fixed on both side members and whose upper part is equipped to be fixed on the dash panel; a cowl member whose each of two edges are connected to an upper side of the pair of support members by welding, the cowl member arranged to support a lower side of the cowl panel; a pair of side frames arranged at the lower side of the side members along an extension line where the lower part of the support members is extended; and a cross member arranged so that each of the lower parts of the side frames are mutually connected, wherein each of the cowl member, the support members, the side frames and the cross member are connected to be a ring shape.

6 Claims, 3 Drawing Sheets

MOUNTING STRUCTURE OF FRONT BODY FRAME IN VEHICLE

CROSS-REFERENCE TO RELATED APPLICATION

The present application claims priority to Korean Patent Application Number 10-2009-0111768, filed on Nov. 19, 2009, the entire contents of which are incorporated herein for all purposes by this reference.

BACKGROUND OF THE INVENTION

1. Field of the Invention

The present invention relates to a mounting structure of a front body frame in a vehicle. More particularly, the present invention relates to a mounting structure of a front body frame of a vehicle, in which, by improving the mounting structure between a body shell and a chassis around an engine compartment in the vehicle, it may secure the stability of the vehicle as well as the rigidity of the vehicle.

2. Description of Prior Art

In general, a vehicle is structurally divided into a body shell and a chassis. The body shell is a part for forming the appearance of the vehicle by including an engine compartment. The chassis is a part exclusive of the body shell, in which an engine or other apparatuses which need to drive the vehicle may be stably arranged.

FIG. 1 is a view for explaining a structure around a general engine compartment of a vehicle according to the prior art.

As shown in FIG. 1, side members 12 are arranged at both lower parts of an engine compartment 10, and a dash panel 14 is arranged at a rear part of the engine compartment 10 in order to form a boundary between a vehicle compartment and the engine compartment 10. Also, a tire apron 16 is arranged at an upper side of the side members 12, and a shock absorber cover 18 is arranged to be fixed at an upper side of the tire apron 16. Besides, a cowl panel 20 is arranged at an upper part of the dash panel 14, and both edges of the cowl panel 20 are equipped to be fixed at the shock absorber cover 18.

But, in case of the above-described mounting structure of the front body frame in the vehicle of the prior art, components constituting for the circumference of the engine compartment are not firmly combined with each other. Accordingly, there was a problem that it may decrease the stability for adjusting the vehicle with regard to an external force which may occur while the vehicle is in motion or with regard to a road surface condition.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

In order to overcome the drawbacks, the present inventions may be directed to provide a mounting structure of a front body frame in a vehicle, in which, by improving the mounting structure between a body shell and a chassis around an engine compartment in the vehicle, it may secure the stability of the vehicle as well as the rigidity of the vehicle.

An aspect of the present invention is directed to a mounting structure of a front body frame for a vehicle in which a circumference of an engine compartment includes side members arranged at both lower parts of an engine compartment, a dash panel arranged in order to form a boundary between the engine compartment and a vehicle compartment, a tire apron arranged at an upper side of both side members, a shock absorber cover arranged on the tire apron, and a cowl panel arranged at an upper side of the dash panel. The mounting structure may include a pair of support members whose lower part is equipped to be fixed on both side members and whose upper part is equipped to be fixed on the dash panel, a cowl member whose each of two edges are connected to an upper side of the pair of support members by welding and arranged to support a lower side of the cowl panel, a pair of side frames arranged at the lower side of the side members along an extension line where the lower part of the support members is extended, and a cross member arranged so that each of the lower parts of the side frames are mutually connected, wherein each of the cowl member, the support members, the side frames and the cross member are connected to be a ring shape.

The mounting structure may additional include a ring-shaped protrusion formed to be protruded as a ring shape at a center part of the shock absorber cover so that both edges of the cowl panel are inserted to be assembled, and an insert hole formed to be penetrated through both edges of the cowl panel corresponding to the ring-shaped protrusion.

In an aspect of the present invention, the cowl panel and the shock absorber are securely affixed by a welding process in a state where the insert hole formed at both parts of the cowl panel is inserted into the ring-shaped protrusion of the shock absorber cover, and the support member and the cowl member are securely affixed by a welding process to be mutually connected.

According to the mounting structure of the front body panel in the vehicle of the present invention, it may secure the rigidity of the body shell and the chassis around the engine compartment, and may also secure the stability for adjusting the vehicle with regard to an external force which may occur while the vehicle is in motion, a road surface condition, or the like.

In particular, according to the mounting structure of the front body panel in the vehicle of the present invention, it may secure the rigidity of the circumference of the engine compartment by being mutually connected as a ring shape by means of the support member, the cowl member, and the like.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Now, a mounting structure between a body shell and a chassis around an engine compartment according to various embodiments of the present invention will be explained in more detail with reference to the attached drawings.

Figure 1:
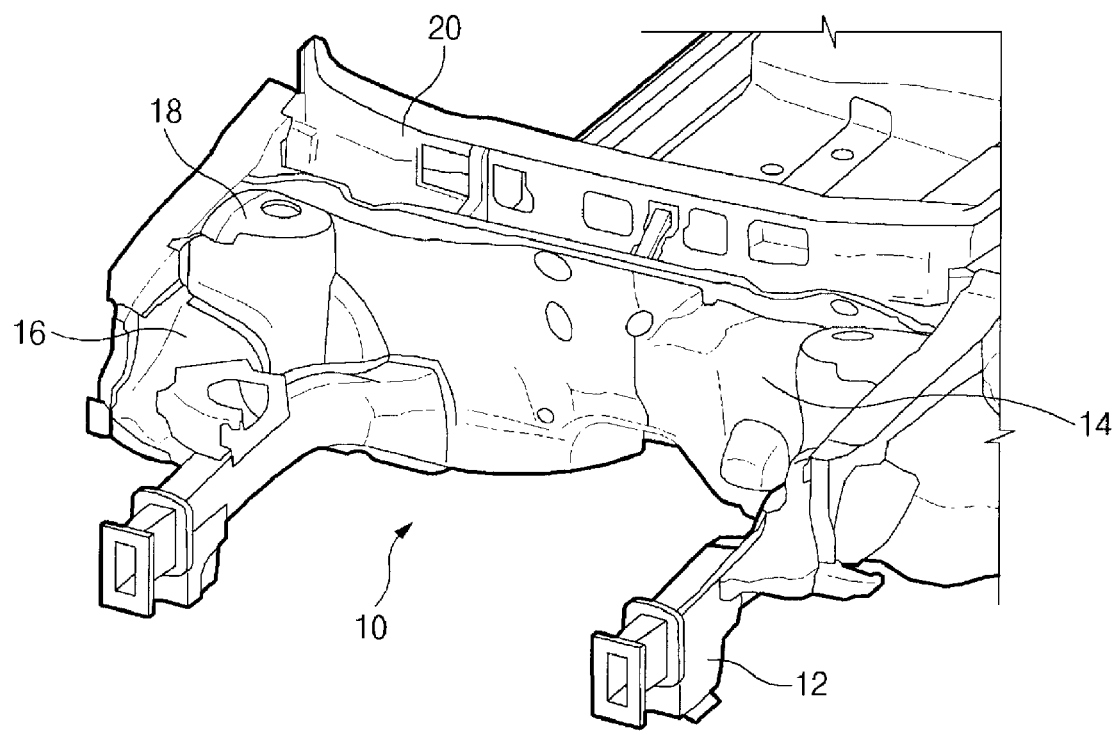
FIG. 1 is a view for explaining a structure around a general engine compartment in a vehicle according to the prior art.
Figure 2:
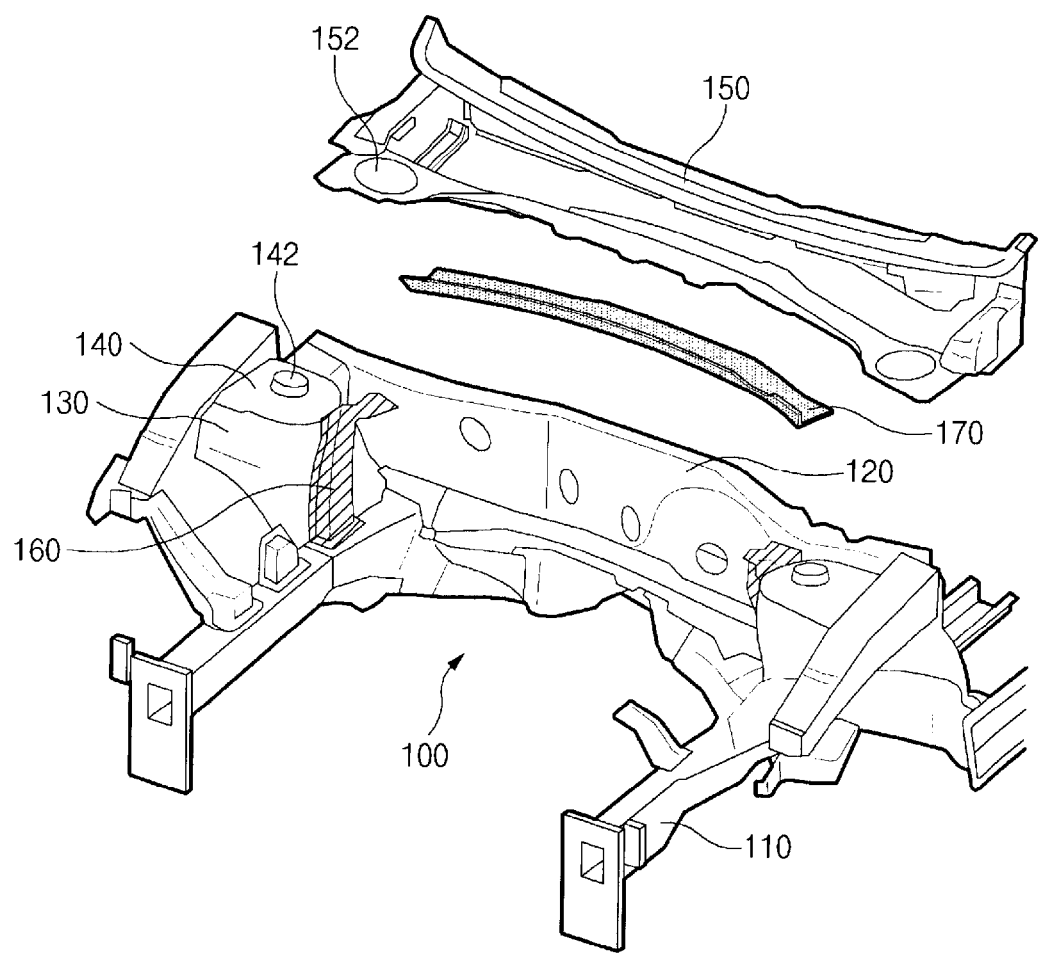
FIG. 2 is a perspective view for illustrating an exemplary mounting structure between a body shell and a chassis around an engine compartment according to the present invention.
Figure 3:
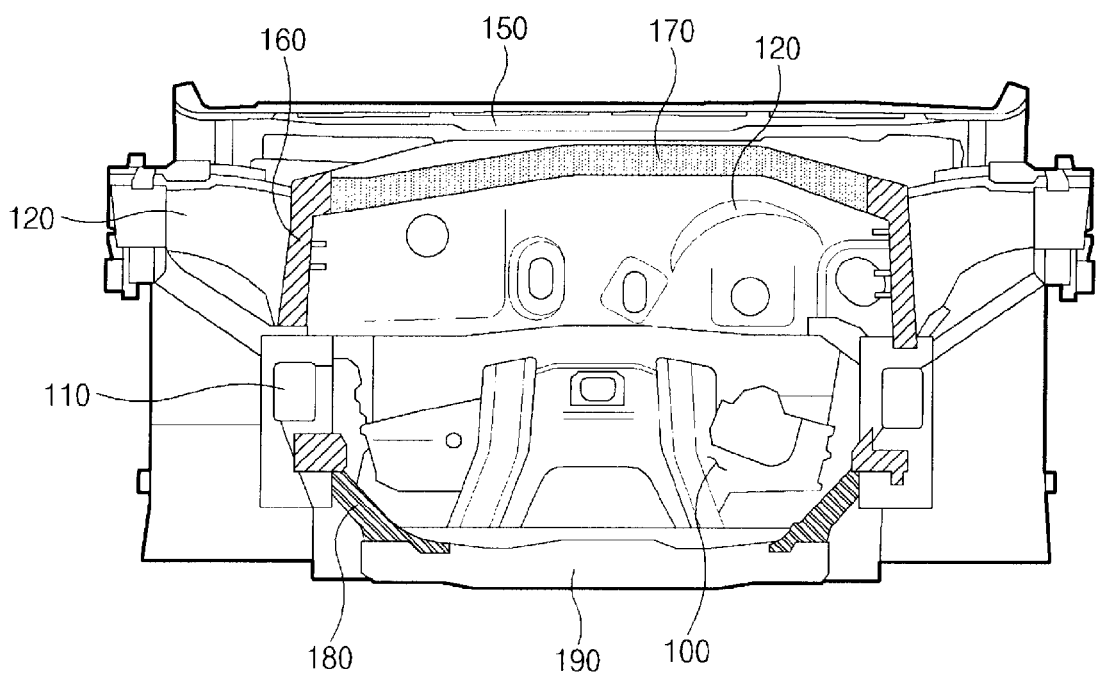
FIG. 3 is a front view for illustrating an exemplary mounting structure between a body shell and a chassis around an engine compartment according to the present invention.

FIG. 2 is a perspective view for illustrating a mounting structure between a body shell and a chassis around an engine compartment according to various embodiments of the present invention, and FIG. 3 is a front view for illustrating a mounting structure between a body shell and a chassis around an engine compartment according to various embodiments of the present invention.

A numeral reference 100 represented in the FIGS. 2 and 3, indicates an engine compartment 100.

As shown in FIGS. 2 and 3, a mounting structure of a front body frame according to various embodiments of the present invention, may be composed on the basis of a structure that a circumference of an engine compartment is surrounded by combining side members 110 arranged at both lower parts of an engine compartment 100, a dash panel 120 arranged at a rear part of the engine compartment 100 in order to form a boundary between the engine compartment 100 and a vehicle compartment, a tire apron 130 arranged at an upper side of both side members 110, a shock absorber cover 140 arranged on the tire apron 130, a cowl panel 150 arranged at an upper side of the dash panel 120, and the like.

In particular, the mounting structure of the front body frame according to various embodiments of the present invention, may additionally include a pair of support members 160 for mutually connecting an upper part of the side members 110 and an upper part of the dash panel 120, a cowl member 170 for mutually connecting upper sides of the pair of support members 160, side frames 180 arranged at the lower side of the side members 110 along an extension line where the lower part of the support members 160 is extended, and a cross member 190 for mutually connecting each of the lower parts of the side frames 180.

The above-described lower part of the support member 160 is equipped to be fixed on both of the side members 110, and the upper part the support member 160 is equipped to be fixed on the dash panel 120, in which a part needed to be combined or securely affixed may be attached by a welding process.

Besides, both edge of the cowl member 170 according to various embodiments of the present invention may be combined, that is, securely affixed to the upper edge of the pair of the support member 160 by a welding process, and the cowl member 170 is arranged for supporting the lower part of the cowl panel 150.

The side frames 180 according to various embodiments of the present invention is arranged at the lower part of the side members 110 along an extension line where the lower part of the support member 160 is extended, in which each of lower parts of the side frames 180 are mutually connected by the cross member 190.

In particular, in case where an assembly of the above-described cowl member 170, the support member 160, the side frame 180 and the cross member 190 is finished, the mounting structure, as shown in FIGS. 2 and 3, may have a ring-shaped structure.

On the other hand, the mounting structure of the front body frame according to various embodiments of the present invention, a ring-shaped protrusion 142 is additionally formed to be protruded as a ring shape at a center part of the shock absorber cover 140 so that both edges of the cowl panel 150 are inserted to be assembled, and an insert hole 152 is additionally formed to be penetrated through both edges of the cowl panel 150 corresponding to the ring-shaped protrusion 142. That is, while both edges of the cowl panel 150 are assembled on the upper edge of the shock absorber cover 140, the insert hole 152 formed in the cowl panel 150 may be assembled to be inserted into the ring-shaped protrusion 142 formed on the shock absorber cover 140.

In particular, in a state where the insert hole 152 formed on both sides of the cowl panel 150 is inserted into the ring-shaped protrusion 142 of the shock absorber cover 140, the cowl panel 150 and the shock absorber cover 140 are mutually affixed by a welding process.

Since the body shell and the chassis around the engine compartment are formed as the above-described process, it is possible to improve the rigidity of the body shell and the chassis around the engine compartment. Besides, it is possible to secure the stability for adjusting the vehicle with regard to an external force which may occur while the vehicle is in motion or with regard to a road surface condition.

In addition, since parts around the engine compartment 100 are connected with each other in the ring shape by the support member 160, the cowl member 150, the side frames 180, the cross member 190, and the like, it is possible to secure the rigidity of the body shell and the chassis around the engine compartment 100.

Besides, by securing the rigidity of the circumference of the engine compartment 100 as above-described, it is possible to prevent that external noise is induced, and to increase a torsion dynamic stiffness. In addition, it may have an advantage that it may easily absorb a shock responding to the collision of the vehicle.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting structure of a front body frame of a vehicle, in which a circumference of an engine compartment includes a pair of side members arranged at respective lower sides of an engine compartment, a dash panel arranged to form a boundary between the engine compartment and a vehicle compartment, a pair of tire aprons arranged at an upper side of the respective side members, a pair of shock absorber covers arranged on respective tire aprons, and a cowl panel arranged at an upper side of the dash panel, the mounting structure comprising:

a pair of support members each contacting a respective tire apron and each having a lower part affixed to a respective side member and an upper part affixed to the dash panel;

a cowl member having two edges each connected to an upper side of a respective support member by welding and arranged to support a lower side of the cowl panel;

a pair of side frames each arranged at a lower side of a respective side member substantially aligned with the respective lower parts of the support members; and a cross member arranged to interconnect each of the lower parts of the side frames;

wherein the cowl member, the support members, the side frames and the cross member form a closed loop at a front of the dash panel and a mounting portion of a front shock absorber is connected to a circumference portion of the closed loop.

2. The mounting structure of a front body frame in a vehicle according to claim 1, wherein the mounting structure additionally comprises:

a ring-shaped protrusion formed at a center part of the shock absorber cover; and an insert hole penetrating through both edges of the cowl panel corresponding to the ring-shaped protrusion.

3. The mounting structure of a front body frame in a vehicle according to claim 2, wherein the cowl panel and the shock absorber covers are affixed by a welding process in a state where the insert hole formed at both parts of the cowl panel is inserted into the ring-shaped protrusion of the shock absorber cover, and the support member and the cowl member are affixed by a welding process to be mutually connected.

4. A method of assembling a mounting structure of a front body frame of a vehicle, the method comprising:

providing an engine compartment including a pair of side members arranged at respective lower sides of an engine compartment, a dash panel arranged to form a boundary between the engine compartment and a vehicle compartment, a pair of tire aprons arranged at an upper side of the respective side members, a pair of shock absorber covers arranged on respective tire aprons, and a cowl panel arranged at an upper side of the dash panel;

affixing each lower part of a pair of support members to a respective side member and affixing each upper part of the pair of support members to the dash panel, with each of the pair of support members contacting a respective tire apron;

welding respective edges of a cowl member to an upper side of a respective support member, wherein the cowl member is arranged to support a lower side of the cowl panel;

arranging a pair of side frames, each at a lower side of a respective side member such that they are substantially aligned with the respective lower parts of the support members; and interconnecting a cross member with each of the lower parts of the side frames;

wherein the cowl member, the support members, the side frames and the cross member form a closed loop at a front of the dash panel and a mounting portion of a front shock absorber is connected to a circumference portion of the closed loop.

5. The method according to claim 4, further comprising:

providing a ring-shaped protrusion formed at a center part of the shock absorber cover; and providing an insert hole penetrating through both edges of the cowl panel corresponding to the ring-shaped protrusion.

6. The method according to claim 5, wherein the cowl panel and the shock absorber covers are welded in a state where the insert hole formed at both parts of the cowl panel is inserted into the ring-shaped protrusion of the shock absorber cover, and the support member and the cowl member are affixed by a welding process to be mutually connected.

* * * * *